INVENTORS.
DONALD Z. BLAU
ROBERT A. FLOWER
ATTORNEY

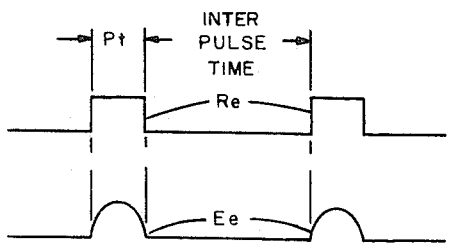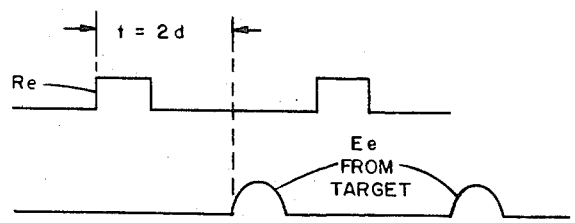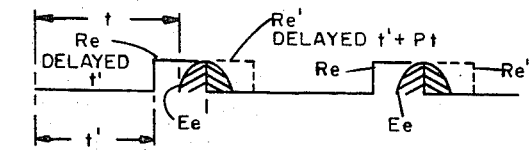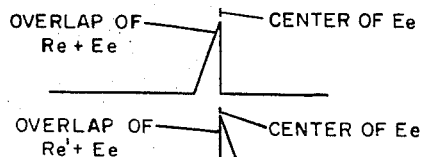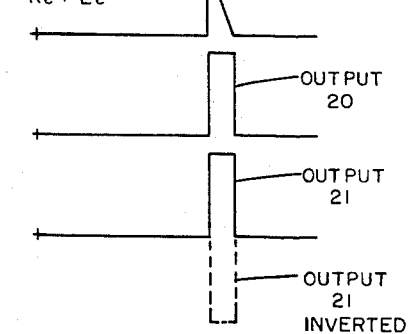

United States Patent Office 3,402,630
Patented Sept. 24, 1968

3,402,630
OPTICAL RADAR RANGING SYSTEM
Donald Z. Blau, Mount Vernon, and Robert A. Flower, White Plains, N.Y., assignors to General Precision Systems Inc., a corporation of Delaware
Filed Feb. 5, 1965, Ser. No. 430,573
3 Claims. (Cl. 88—1)

ABSTRACT OF THE DISCLOSURE

A train of pulsed light signals are produced by a laser and trained on a remote target whose range is to be measured and are reflected back to a receiver. A beam splitter derives a portion of the transmitted pulses and these are converted to a reference signal. The reference signal is first delayed for a period of time equal to the excursion period less one-half the pulse time producing a first delayed reference pulse. The first delayed reference pulse is further delayed for a period of time equal to the pulse time producing a second delayed reference pulse. A first converter converts a signal derived from the receiver and the first delayed reference pulse to produce a first comparison signal proportional to the overlap between the received signal and the first delayed reference signal. Additionally, a second converter converts the signal derived from the receiver and the second delayed reference pulse to produce a second comparison signal proportional to the overlap between these latter signals. The comparison signals are subtracted to provide a null signal and also to provide an error signal which is used to control the amount of the first delay.

---

The present invention relates to optical frequency range detecting and range tracking systems. In particular the present invention provides a novel system, operating in the optical frequency range, for range detection and tracking of a remote target. The system includes an optical frequency or light beam generator and transmitter, such as a laser, which may direct a beam of optical or light energy at a remote target, and a light energy receiver for receiving the light energy reflected from the target. The light beam or energy received, which may be referred to as an echo signal, is converted by the receiving component into a corresponding electrical signal or pulse. The echo signal is compared with a reference signal (which substantially corresponds in time origin with the transmitted signal) in time relationship at a common point. The arrival of the echo signal at the common point is displaced in time in accordance with the velocity of the energy through the medium of travel and the distance traveled. A substantially corresponding delay in arrival of the reference signal at the common point is provided by a variable delay line responsive to an electrical value which value has a relation to the delay affected. Thus the electrical value affecting the delay of the reference signal may serve as a measure of the delay of echo signal and therefore a measure of the range between the transmitter of the signal and the target (or the target and the receiver of the echo signal).

The present range detecting and range tracking system provides for determining instantaneous range both manually and semiautomatically, the latter including means for manually adjusting the system so as to approximate the range of the target and a means for automatic range zeroing through comparison of the echo signal and the reference signal. In addition, the present system provides for continuous range tracking, i.e., tracking the range of a target that is changing range with respect to the range tracking system, by employing a closed loop control system for automatically adjusting to a new range by using a comparison signal as an error signal for readjusting the instantaneous range signal.

The optical frequency generator, in its preferred form, may be a laser providing a continuous wave (CW) output. The optical or light energy may be applied to a Kerr cell which may be adjustably controlled so as to provide a train of light beam pulses, the duration and pulse rate of which may be precisely controlled. Thus, in its preferred form, the generator-transmitter may provide a series or train of substantially equal length, light beam pulses at a predetermined rate. In the alternative, a laser providing a pulsed output may be employed, thus avoiding the use of the Kerr cell.

The transmitter and the receiver of the present system may be so positioned so as to be in substantially a side-by-side arrangement and, facing the same direction, so that the range or distance between the transmitter and target is substantially equal to the range or distance between the target and the receiver. This essentially positions the transmitter and the receiver at a substantially common point with relation to the target.

As the generated light energy is transmitted, part of the energy is recovered and serves as a reference signal against which the echo signal is compared. The light energy reference signal is also converted into an electrical signal thereby providing an echo signal and a reference signal in electric form.

Since the speed of light through the medium of travel is a predeterminable value, then the distance or range to the remote target may be a function of time of the excursion of the echo signal measured from the time of transmission. Thus, it remains to accurately determine the time of travel of the echo pulse. This is accomplished in the present system in a two channel arrangement in which the reference signal is controllably delayed, for example, by use of a variable delay line, in one channel, and is thereafter conducted to a common point and the echo signal is received and conducted, via a second channel to the same common point where both signals are matched or compared with respect to time of arrival. The preferred arrangement provides for a dual matching or comparison system in which the reference signal is delayed in time by the variable delay line and then further offset or delayed so as to essentially provide two reference signals (both developed from the same generated signal), each of which are matched with the same echo signal (which also has a common origin). When the reference signals and the echo signal are in a predetermined time relation with respect to each other, the time delay provided by the variable delay line may serve as a measure of the time delay of the echo signal. By employing a variable delay line which is variably responsive in relation to the value of a voltage, then the voltage may serve as a measure of the time delay of the echo signal and may be calibrated in range.

In order to assure accurate range detection the dual matching system is provided which essentially determines the center of the echo pulse. Since the pulse duration of the echo pulse is known, the time of arrival of the leading edge of the pulse may be accurately determined when the center of the echo pulse is detected, in point of time. By determining the time of arrival of the leading edge of the echo pulse, the range of the target reflecting the light energy may be accurately obtained, and the pulse length of the echo pulse becomes non-critical, except that such pulse length should be a known value.

Accuracy of range is further assured by eliminating human error by further comparing the outputs of the dual matching arrangement. The compared outputs may develop an "error signal" which may be employed in a closed loop control arrangement for "zeroing-in" on the exact range of the target. The "error signal" also serves as a means of automatically tracking the range of a target through the closed loop control arrangement.

Accordingly, it is an object of the present invention to provide a remote target range determining and range tracking system operated at optical frequencies in which a reference signal is adjustably delayed in time and compared with an echo signal which is delayed in time due to the excursion of the signal to and from a target and the range of the target may be a measure of the time delay of the reference signal.

Another object is to provide a range determining and range tracking system operated at optical frequencies in which a reference signal is delayed in time to match the time of arrival of an echo signal, at a common point so that range may be determined as a function of the delay of the reference signal.

Another object is to provide an optical radar range determining system in which a reference signal is delayed in time to match the time of arrival of an echo signal generated in common with the reference signal and the means for delaying the reference signal is controlled by a voltage, the value of which may be a substantial measure of the range of the target from which the echo signal was reflected.

Another object is to provide an optical frequency range detection and tracking system in which a reference signal and an echo signal developed from a common transmitted signal are time-matched, in dual channel arrangement by varying a delay line conducting the reference signal and by further offsetting the time of the reference signal so as to essentially develop two reference signals so as to provide a dual matching arrangement and thereafter further matching the dual outputs of the dual matching arrangement to control variation of the delay line so delaying the reference signal and in which the control for the variable delay line is a voltage the value of which is a measure of the range of the target.

Another object is to provide an optical radar range determining and range tracking system in which a reference signal and an echo signal developed from a common source (i.e., the transmitted signal) are matched by time-delay of the reference signal and in which the time matching operation performed upon the reference and echo signal provides an output for controlling the time-delay of the reference signal so that the range of a target is effectively tracked in accordance with an output partly representing a deviation from a matched condition as the range changes.

These and other objects will become apparent from reading the following detailed description with reference to the accompanying drawings in which:

FIG. 2a is a graphic representation of the reference pulse and echo pulse at zero range;

FIG. 2b is a graphic representation of the reference pulse and the echo pulse, the latter displaced in time $t$ as reflected from a remote target;

FIG. 3a is a graphic representation showing one reference pulse displaced in time relation $t'$ and a second reference pulse displaced in time relation $(t'+Pt)$ so that the two reference pulses substantially bisect the time displaced echo pulse;

FIG. 3b is a graphic representation showing a pulse representing the overlap in time between the reference pulse R$e$ and the echo pulse;

FIG. 3c is a graphic representation showing a pulse representing the overlap in time between the reference pulse R$e'$ and the echo pulse;

Figure 1:
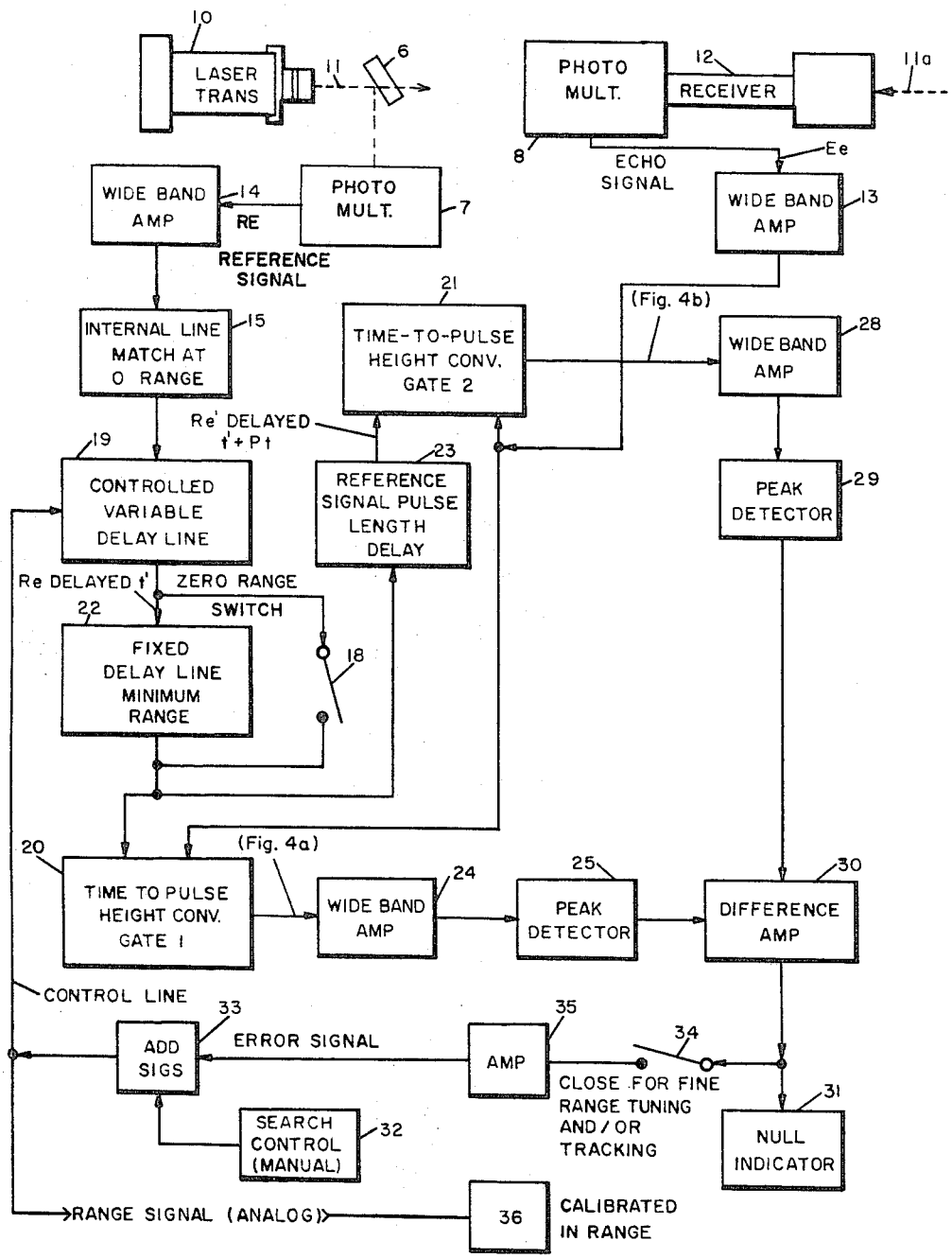
FIG. 1 is a block diagram of the optical radar range determining and range tracking system.

FIG. 4a is a graphic representation showing the output of gate 1, the amplitude of the pulse being proportional to the time duration of the overlap of R$e$ and E$e$ represented in FIG. 3a and FIG. 3b; and FIG. 4a is a graphic representation showing the output of gate 2, the amplitude of the pulse being proportional to the time duration of the overlap of R$e'$ and E$e$, represented in FIG. 3a and FIG. 3c, and also shown inverted, in phantom form.

Referring to FIG. 1, the present optical frequency radar range determining and range tracking system is represented in block form with an optical frequency signal generator and transmitter generally represented as block 10. Block 10 may include a laser, an associated Kerr cell and one or more collimating lenses. The transmitted pulse indicated by the broken line 11 is transmitted to a beam splitter 6 where a portion of the light is diverted to a photomultiplier 7 which generates a reference signal R$e$. Block 12 may represent a receiver which may be in the form of a telescope having optical signal collecting lenses, a variable field stop and a photodetector or photomultiplier 8. The laser, in its preferred form, provides a CW optical signal which is applied to a Kerr cell which serves as a shutter for providing output pulses of optical frequency signals of a predetermined duration and at a predetermined pulse rate. The light energy pulse output of the transmitter may, for example, be pulses having a duration of some 20 nanoseconds and may occur at such a rate that the interpulse period exceeds the excursion time of the echo pulse, i.e., the excursion time from the transmitter to the target and back to the receiver.

The Kerr cell, which is well known to those skilled in the art, may be excited by means of a voltage so as to provide the desired pulse duration and pulse rate. Also associated with the transmitter may be one or more lenses for collimating the light beam pulse output. In addition a beam splitter serves to provide a reference pulse by recovering part of the transmitter signal and a photodetector or photomultiplier serves to convert the light energy to electric energy. The details of the transmitter and the receiver have been omitted for convenience and simplification.

In accordance with the apparatus provided, as by the use of optical beam splitter 6, for example, part of the transmitted pulse 11 may be recovered to serve as a reference pulse. The reference pulse may then be converted to a corresponding electrical signal, R$e$, by means of a photomultiplier 7. The electrical signal may be applied to wide band amplifier 14. The echo pulse 11$a$ is the transmitted pulse 11 reflected from a remote target, delayed in time in accordance with the velocity of the energy and the distance traveled. The echo pulse is also converted to an electrical pulse, E$e$, by means of another photomultiplier 8. The pulse E$e$ is applied to a wide band amplifier 13. The wide band amplifiers 13, 14, 24 and 28, which may also be referred to as video amplifiers, are sufficiently wide in bandpass characteristics so as to amplify and pass essentially all the sidebands resulting from the conversion of light energy to electric energy. The output of the amplifier 14, which is the amplified signal R$e$ in electric form, is applied to an adjustable internal line matching component 15, which essentially provides a means for equalizing the time delay of the two channels (the reference channel and the echo channel) at zero range. Thus the internal match component 15 may be used to balance or zero adjust the system at zero range so that accurate range determination is assured.

Referring to FIG. 2a, representations of two successive reference pulses R$e$ and two successive echo pulses E$e$ are presented. The pulse duration is represented as time P$t$ with the interpulse time so labeled. In order to distinguish the two forms of pulse graphically, one pulse R$e$ is represented in square pulse form and the other pulse E$e$ is represented in curve form. The pulses are represented as substantially in coincidence which occurs at the time of generation or at zero range. This is because both the reference pulses and the echo pulses originate from the pulse generated by the transmitter.

The system as described fully below employs dual matching of two reference pulses (each referenced to the same generated pulse, one of which is offset in time by an amount equal to one pulse length) with the same echo pulse for accurate determination of range. The reference pulse R$e$ is preserved and is also applied to a delay means for providing a second reference pulse R$e'$ which is delayed in time by one pulse length. The center of the echo pulse is determined by cooperation of the leading edge and the trailing edge of the respective reference pulses R$e$ and R$e'$ by such matched arrangement. Since the pulse R$e'$ is offset in time one pulse length the trailing edge of pulse R$e$ is in coincidence with the leading edge of pulse R$e'$. Since the reference pulses and the echo pulses are essentially the same pulse (the reference pulse being obtained by use of a beam splitter) the pulses are essentially the same pulse length. One method of effectively bisecting the echo pulse through dual matching (see FIG. 3a) is represented where one reference pulse R$e$ will lead the echo pulse by one half the pulse time length while the other reference pulse R$e'$ (the one offset in time equal to one pulse length) will lag the echo pulse in time, by one half a pulse length. By using such method the reference pulses are out of coincidence with the echo pulse when a determination of range is obtained and therefore either of two methods of initially setting up or zeroing the system may be used.

Since the echo pulse and the reference pulse are essentially the same pulse both pulses may be in coincidence at zero range, as seen in FIG. 2a. However, when determining the range of a remote target ($t$ equals $2d$ which equals the excursion time of the echo pulse or twice the distance) the delay adjusted reference pulse R$e$ (not offset) will lead the echo pulse as seen in FIG. 3a. Thus the time of one half of a pulse length must be considered in initially adjusting the system. One method of initially adjusting or setting up the system is, to adjust the internal line lengths so that at zero range the reference pulse and echo pulse are in coincidence. This may be done by adjustment of the internal line match component 15 with the zero range switch 18 closed and the variable delay line set at zero so that the internal delay (or electrical length) of both channels is equal. The range indicator may then be calibrated to compensate for the fact that the reference pulse leads the echo pulse when range of an object is detected, by a time equal to one half a pulse duration. Thus the lead of the reference pulse does not introduce error when range is indicated. Another method, which is the preferred method of adjustment, is initially to adjust the internal line lengths so that at zero range the reference pulse leads the echo pulse by a time equal to one half a pulse duration. This may be done by essentially shortening the electrical length of the reference channel with respect to the echo channel by one half a pulse length. The range indicator may be adjusted to read zero at zero range and when range is determined the indicator will then read the range without the need of compensating for lead of the reference pulse since the lead is absorbed at zero range.

For the purpose of further describing the operation of the system, the method of initial adjustment used is not germane.

Let it be assumed that a pulse is generated and transmitted by the transmitter 10 and that part of such pulse so generated is recovered as a reference pulse, R$e$, by means of a beam splitter, for example, and the remainder of the individual pulses range to a remote target and return at a time $t$, measured from the time of initial generation of the pulse to the return of the leading edge of the echo. The return signal may be considered the echo pulse E$e$. FIG. 2a may illustrate the relation between two successive reference and echo pulses (in coincidence) in time relationship, when generated. FIG. 2b may illustrate two successive reference and echo pulses in time relationship at the time of reception of the echo pulse after return of the pulse E$e$.

In point of time, following a reference pulse, the pulse R$e$ is recovered from the transmitted pulse and is converted into an electrical pulse by means of a photomultiplier 8. The electrical pulse R$e$ is applied to a wide band amplifier 14 and thence to the internal line match component 15, assumed adjusted. The pulse is then applied to the controlled variable delay line 19. Assuming switch 18 to be closed, the pulse is applied to the time-to-pulse-height converter 20. The time-to-pulse-height converter which is also referred to as a gate, is a component which received two inputs, in this case, R$e$ and E$e$, and provides therefrom an output pulse having an amplitude dependent upon the amount or degree of overlap of the two input signals. This is graphically illustrated in FIGS. 3a, 3b and 3c where FIG. 3a illustrates two sets of successive pulses (R$e$, R$e'$ and E$e$) with the shaded area of the overlap between pulses R$e$ and E$e$ and pulses R$e'$ and E$e$ illustrated in each set of pulses. FIG. 4a represents the output of time-to-pulse-height converter 20 which output amplitude is essentially proportional to the amount or degree of overlap of R$e$ and E$e$ and FIG. 4b represents the output of time-to-pulse-height converter 21. The pulse R$e'$ is the pulse R$e$ offset or delayed in time one pulse duration, as will be further described. The pulse E$e$ in each set of pulses is the echo signal originally generated with the reference R$e$ (R$e'$) by which the echo signal is overlapped.

When the echo pulse is received, the pulse E$e$ is converted into an electrical signal by means of a photomultiplier 8, and the electrical pulse is amplified by the wide band amplifier 13 and is applied to the time-to-pulse-height converters 20 and 21. If the pulses R$e$ and E$e$ are so far apart in time relation so that there is no overlap of the pulses, there will be no output from either 20 or 21. Under such conditions the search control 32 may be manually adjusted so as to vary the variable delay line 19 and thereby change the delay of the pulse R$e$. It should be understood that although a single pulse was traced to the block 20 the transmitter is continuously transmitting a chain of pulses and the echo pulses are being received.

In addition to applying the pulse R$e$ to block 20 the pulse R$e$ is also applied to block 23 which relays or offsets the reference pulse for a time equal to the time duration of the pulse length (P$t$). The pulse R$e'$ in FIG. 3a represents this delayed or offset reference pulse. The pulse R$e'$ is applied to the time-to-pulse-height converter 21, which is essentially the same type of component as that represented by block 20. The pulse R$e'$ is represented in broken line form in square configuration in FIG. 3a.

As the search control is adjusted the delay line 19 is lengthened (or shortened) electrically thereby delaying the pulse R$e$ and thus R$e'$. The output of the search control may be voltage that is increased or decreased in amplitude, adjustably. Assume that the echo pulse E$e$ is delayed a time $t$ in its excursion to and from the target. As the search control is varied, the output voltage is changed so as to vary the characteristics of the variable delay line and the variable delay line delays the pulse R$e$ (and R$e'$). When there is some overlap between R$e$ and E$e$ or R$e'$ and E$e$ or both, there will be an output signal corresponding to the degree of overlap from block 20 and/or block 21 respectively. Ideally, the pulse R$e$ may be delayed a time $t'$ (which is essentially $t-\frac{1}{2}Pt$) so that pulse R$e'$ is then delayed a time $t'+Pt$ (which is essentially $t+\frac{1}{2}Pt$). The time $t'$ represents the time $t$ less the time of one half of the pulse length duration, thus the leading edge of pulse R$e$ and the trailing edge of pulse R$e'$ will substantially occur at the center of the pulse E$e$ when range is determined. This may be seen in FIG. 3a shown with two sets of pulses. The shaded area shows the overlap between the reference pulses (R$e$ and R$e'$) and the echo pulse, the echo signal E$e$ being common to both the pulse R$e$ and R$e'$. In this condition true range of the target may be determined in a system in which the length of the transmitted pulse is non-critical.

FIG. 3b represents the overlap of pulses Re and Ee and FIG. 3c represents the overlap of the pulses Re' and Ee. It will be noticed that although the curves of the pulses in FIGS. 3b and 3c differ in contour, the amplitudes are substantially similar. This represents a condition of equal overlap which results from essentially locating the center of the echo pulse Ee.

The outputs of blocks 20 and 21 represented by FIGS. 4a and 4b respectively are amplified in uniformity by the wideband amplifiers 24 and 28 respectively and each respective amplified signal is applied to a peak detector 25 and 29 respectively. The peak detector (which may be referred to as an integrator) 25 (and 29) is a component which provides an output voltage which is proportional in amplitude to the peak amplitude of the input signal. The output of gate 21 is illustrated as inverted, in broken line form. Thus it will be seen that any of several signal comparing systems may be utilized to compare the outputs of 20 and 21, if desired.

The outputs of the peak detectors 25 and 29 are applied to a difference amplifier 30. The difference amplifier provides an output voltage proportional to the difference in voltage between its two inputs. The output voltage may be applied to a D.C. voltmeter, such as null indicator 31. The null indicator may provide a null indication in response to a predetermined output of the difference amplifier 30. The null may serve to indicate that the reference signals Re and Re' have been adjusted in time relation with the echo signal Ee so that the signal Ee is essentially bisected.

When the search control 32 has been adjusted so that a predetermined desired reading on the null indicator is obtained, then the output of the search control, which may be an analog voltage which is applied to the indicator, block 36, may affect the indicator so that the instantaneous range of the target is indicated by a needle or other indicator on the face of the indicator or meter 36.

If the target is stationary, with respect to the range detection device, obviously when a predetermined condition between the reference signals Re and Re' and the echo signal Ee is obtained the ranged detection device has been adjusted so that true range may be indicated. The output of the search control may be applied to the indicator 36 which may be calibrated in range. This is reprsented by the range signal (analog) which excites or controls the indicator 36. Manual adjustment of the variable delay line 19 may be made via the search control with the switch 34 open. This essentially provides manual operation of the range detecting system.

The present device may also track the range of a remote target. The principle of operation is the same as described above for determining the range of a stationary remote target.

As previously stated the search control is manually operated so as to vary the delay line 19 to delay the reference pulse for the matching operation. Obviously with the manually operated search control tracking may be accomplished so as to provide a constant instantaneous range by continuous manual readjustment. However, for automatic range tracking, the present apparatus makes use of the difference amplifier 30 output as an error signal which may be used to adjust the value of the analog voltage applied to the variable delay line 19 and to the range indicator 36.

In order to accomplish automatic tracking, the analog voltage applied to the variable delay line must not only be adjusted to a new value but when the "null" is obtained, the new value of voltage applied to the variable delay line must be maintained. Obviously this could be done by a servo system which may be driven to a new value or position by the output of the difference amplifier and held in the new position when a "null" is obtained. The servo may provide an analog output which could be electrically added to the output of the search control by use of a summing or adding circuit such as 33 (Add Sigs.). This arrangement is not shown but it is obvious that such arrangement may be provided by closing switch 34 and substituting the servo for the amplifier 35, with the servo providing the "error signal" to the adding circuit 33.

The preferred arrangement of range tracking includes an amplifier such as represented by 35 which may be driven to provide an output, which output may be varied in accordance with the output of 30 and, like a servo may be maintained, in its changed condition, when the "null" is obtained. Obviously switch 34 would be closed so that the output of the difference amplifier 30 may serve to drive the amplifier to a new output value. An example of an amplifier which may be used for the required purpose is taught by John W. Gray in his United States Patent No. 2,622,231 issued Dec. 16, 1962 under the title Integrator.

Essentially the search control may be manually adjusted so that the output voltage of the search control varies time delay of the variable delay line to obtain some degree of overlap of the reference and echo pulses in the dual match arrangement. When some degree of overlap is obtained, the difference amplifier will provide an output corresponding to the degree of mismatch in overlap and in accordance with such mismatch (whether the reference pulse is leading or lagging the echo pulse). The output of the difference amplifier 30 may be applied to the amplifier 35 through the switch 34 to drive the amplifier to a new output so that the output of the amplifier 35 is essentially an error signal employed to correct the output of the search control 32. Thus the output of the search control 32 and the output of the amplifier 35 are both applied to the summing or adding circuit 33 so that the outputs are electrically added and applied to the variable delay line 19 and the indicator 36. This arrangement provides for automatically tracking the range of a remote target, the range of which is changing.

Thus there has been provided a range detecting and range tracking system in the optical frequency range in which the pulse length is non-critical and the use of frequency counting devices is avoided. In addition, the system may be manually operated to provide instantaneous range and range tracking and may also be operated as a coordinated manual and automatic system to provide both instantaneous range and range tracking by use of the closed loop control arrangement. It will further be appreciated that the present system employs readily available components many of which, or all of which, may be in solid state form. The time-to-pulse-height converter, for example, is a component identified as a Time-to-Pulse-Height Converter available as a commercial product from General Applied Science Laboratories, Inc. One type of variable delay line which may be employed is a Variable Delay-Line Type 505a, commercially available from AD-YU Electronics. The fixed delay line may be in the form of a cable the length of which may provide the desired delay. The peak detector may be an integrator circuit, and the difference amplifier, laser and photo-detectors or photomultipliers are components which are well known in the art.

Referring again to FIG. 1, a fixed delay line, 22, is included in the block diagram. This fixed delay may be bypassed by closure of switch 18 so that the range of the range detecting and tracking system may be from substantially zero range to a distance determined by the amount of delay provided by the controlled variable delay line 19. With switch 18 open, the fixed delay line 22 is inserted into the system and then provides a minimum range (some range above zero range) and extends the maximum range. Obviously a series of selectable fixed delay line components may be used so as to provide any one of a series of ranges at which the range detecting and tracking device is operable. The controlled variable delay line 19 may then be selected so that the limit or range (spread) of the component 19 is most practical. A selective switch may be made so that upon selection of a fixed delay in the system the indicator is automatically switched so that the range reading on the meter corresponds to the maximum and minimum range sensitivity.

Although the present invention has been described in its preferred form and some alternate forms of components have been suggested, obviously other changes and/or substitutions may be made, as will be familiar to those skilled in the art without departing from the spirit of the invention as defined in the appended claims.

What is claimed is:

1. A device for determining the range of a remote target comprising, means for generating and directing a pulsed beam of laser light toward a remote target, beam splitter means in the path of the beam of light for diverting a portion thereof, photomultiplier means having said diverted portion of light imposed thereon and producing as an output therefrom an electric pulse reference signal, first delay means coupled to the output of said photomultiplier for delaying said electric pulse reference signal a selected period of time and producing a first delayed reference signal as an output, second delay means coupled to the output of said first delay means for delaying said first delayed reference signal a period of time equal to the pulse time period of said electric pulse reference signal and producing a second delayed reference signal as an output, receiving means including a photomultiplier for receiving a pulsed beam of light reflected from said remote target and converting said light pulse into an electric pulse echo signal, first converter means coupled to said first delay means and said receiving means and having said electric pulse echo signal and said first delayed reference signal imposed thereon and producing therefrom a first output signal the magnitude of which is proportional to the overlap of said echo signal and said first delayed reference signal, second converter means coupled to said second delay means and said receiving means and having said electric pulse echo sigal and said second delayed reference signal imposed thereon and producing therefrom a second output signal the magnitude of which is proportional to the overlap of said echo signal and said second delayed reference signal, difference amplifier means coupled to said first and second converter means and having said first and second output signals imposed thereon and producing a difference signal therefrom, indicator means coupled to said difference amplifier means and having said difference signal imposed thereon, a search control means providing a manually variable signal, an adding circuit coupled to said search control means and said difference amplifier means and having said manually variable signal and said difference signal imposed thereon and producing an output therefrom for variably controlling said first delay means, and range indicator means operatively coupled to the output of said adding circuit.

2. A device for determining the range of a remote object as set forth in claim 1 in which said first delay means is variably controlled to delay said electric pulse signal for a period of time equal to the excursion period of said pulsed beam of light minus one-half the pulse time period.

3. A device for determining the range of a remote object as set forth in claim 2 in which a fixed minimum range delay line is inserted between the output of said first delay means and the input of said second delay means, and also between the output of said first delay means and the input of said first converter means.

References Cited

UNITED STATES PATENTS

| 2,422,204 | 6/1947 | Meacham | 343—13 |
| 2,768,372 | 10/1956 | Green | 343—13 |
| 3,097,355 | 7/1963 | Hobrough et al. | 343—13 |
| 3,199,105 | 8/1965 | La Katos | 343—12 |
| 3,248,729 | 4/1966 | Howard et al. | 343—12 |

FOREIGN PATENTS 908,030  10/1962  Great Britain.

OTHER REFERENCES

Stitch et al.: "Optical Ranging System Uses Laser Transmitter," Electronics, Apr. 21, 1961, volume 34, No. 16, pages 51–53.

JEWELL H. PEDERSEN, *Primary Examiner.*

F. L. EVANS, *Assistant Examiner.*